(12) United States Patent
Kim

(10) Patent No.: US 11,840,291 B2
(45) Date of Patent: Dec. 12, 2023

(54) RACK-DRIVEN POWER ASSISTED STEERING APPARATUS

(71) Applicant: HL MANDO CORPORATION, Pyeongtaek (KR)

(72) Inventor: Hyeon Su Kim, Yongin (KR)

(73) Assignee: HL MANDO CORPORATION, Pyeongtaek (KR)

( * ) Notice: Subject to any disclaimer, the term of this patent is extended or adjusted under 35 U.S.C. 154(b) by 0 days.

(21) Appl. No.: 17/676,276

(22) Filed: Feb. 21, 2022

(65) Prior Publication Data
US 2022/0266893 A1 Aug. 25, 2022

(30) Foreign Application Priority Data
Feb. 24, 2021 (KR) .................. 10-2021-0024471

(51) Int. Cl.
*B62D 5/04* (2006.01)
*F16H 25/22* (2006.01)
*F16H 25/20* (2006.01)

(52) U.S. Cl.
CPC ......... *B62D 5/0448* (2013.01); *B62D 5/0421* (2013.01); *F16H 25/2214* (2013.01); *F16H 2025/2096* (2013.01)

(58) Field of Classification Search
CPC ......... F16H 25/2214; F16H 2025/2096; B62D 5/0448
See application file for complete search history.

(56) References Cited

U.S. PATENT DOCUMENTS

| 2003/0062719 | A1* | 4/2003 | Chiu .................. F16H 25/2214 |
| | | | 285/134.1 |
| 2013/0247701 | A1* | 9/2013 | Kiforiuk .............. B62D 5/0448 |
| | | | 74/424.86 |
| 2017/0174253 | A1* | 6/2017 | Kitamura ............ B62D 5/0448 |
| 2017/0349205 | A1* | 12/2017 | Kaneko .................. F16C 27/08 |
| 2020/0278012 | A1* | 9/2020 | Holm .................. F16H 25/2214 |
| 2022/0242476 | A1 | 8/2022 | Kim |

FOREIGN PATENT DOCUMENTS

| DE | 11-2020-002-451 T5 | 2/2022 |
| JP | 2020029908 A | 2/2020 |

OTHER PUBLICATIONS

Office Action dated Jul. 17, 2023 for counterpart DE Patent Application.

* cited by examiner

*Primary Examiner* — Jake Cook
(74) *Attorney, Agent, or Firm* — Harvest IP Law, LLP

(57) ABSTRACT

A steering apparatus with an assistance of a rack-driven power includes a rack bar having an outer circumferential screw groove formed, a ball nut having an inner circumferential screw groove and a pair of first and second ball circulation holes, a nut pulley provided with a space on the inner circumferential surface spaced apart from the outer circumferential surface of the ball nut and coupled to an end of the ball nut, and a return tube disposed between the outer circumferential surface of the ball nut and the inner circumferential surface of the nut pulley.

20 Claims, 12 Drawing Sheets

RACK-DRIVEN POWER ASSISTED STEERING APPARATUS

CROSS REFERENCE TO RELATED APPLICATION

This application claims priority from. Korean Patent Application No. 10-2021-0024471, filed on Feb. 24, 2021, which is hereby incorporated by reference for all purposes as if fully set forth herein.

TECHNICAL FIELD

The present embodiments relate to a rack-driven power assisted steering apparatus. More specifically, in the present embodiments, even if the vehicle is continuously steered while driving, the return tube is not separated from the ball nut, deformed or damaged and the ball is precisely circulated through the return tube to the ball nut to deliver the correct steering assistance force.

RELATED ART

A general rack-driven power assisted steering apparatus includes a steering system that extends from the steering wheel to both wheels and an auxiliary power mechanism that supplies steering assistance power to the steering system.

Such a conventional rack-driven power assisted steering apparatus includes a motor controlled by an electronic control device, a motor pulley fixed to the motor shaft, a ball nut that combines with a rack bar through a ball, a return tube coupled to a ball nut and circulating the ball, a nut pulley coupled to the outer circumferential surface of the ball nut, a belt coupled to the motor pulley and the nut pulley.

However, this rack-driven power assisted steering apparatus had problems in that the return tube was detached, deformed, or damaged due to vibration generated when the ball circulates through the return tube and the ball nut due to continuous steering and the impact transmitted from the road surface while driving the vehicle.

In addition, if the return tube is not accurately fixed to the ball nut, the ball is not circulated properly, so that the steering assistance power is lowered and the efficiency of power transmission is lowered.

DETAILED DESCRIPTION OF THE INVENTION

Technical Problem

Accordingly, in the rack-driven power assisted steering apparatus, the present embodiments provide a rack-driven power assisted steering apparatus in which even if the vehicle is continuously steered while driving, the return tube is not separated from the ball nut, deformed or damaged and the ball is precisely circulated through the return tube to the ball nut to deliver the correct steering assistance force.

Technical Solution

According to an aspect, the present embodiments provide a rack-driven power assisted steering apparatus including a rack bar having an outer circumferential screw groove formed on its outer circumferential surface, a ball nut having an inner circumferential screw groove corresponding to the outer circumferential screw groove on an inner circumferential surface, and a pair of first and second ball circulation holes penetrating the inner circumferential and outer circumferential surfaces are spaced apart from each other on both sides along the inner circumferential screw groove, a nut pulley provided with a space on the inner circumferential surface spaced apart from the outer circumferential surface of the ball nut and coupled to an end of the ball nut, and a return tube disposed between the outer circumferential surface of the ball nut and the inner circumferential surface of the nut pulley, one end coupled to the first ball circulation hole and the other end coupled to the second ball circulation hole to circulate the balls.

Advantageous Effects

According to the present embodiments, there may be provided a rack-driven power assisted steering apparatus in which even if the vehicle is continuously steered while driving, the return tube is not separated from the ball nut, deformed or damaged and the ball is precisely circulated through the return tube to the ball nut to deliver the correct steering assistance force.

MODE FOR CARRYING OUT THE INVENTION

Figure 1:
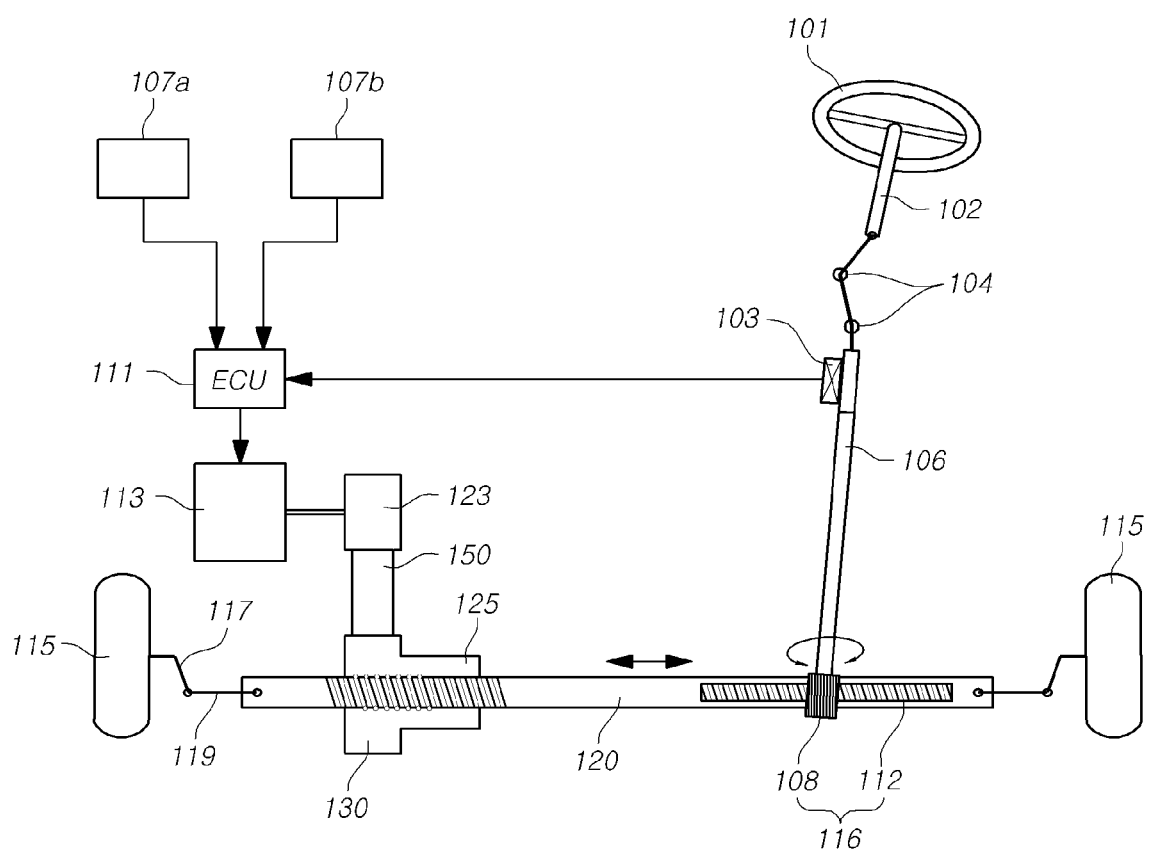
FIG. 1 is a schematic diagram schematically showing a rack-driven power assisted steering apparatus according to the present embodiments.

In the following description of examples or embodiments of the present disclosure, reference will be made to the accompanying drawings in which it is shown by way of illustration specific examples or embodiments that can be implemented, and in which the same reference numerals and signs can be used to designate the same or like components even when they are shown in different accompanying drawings from one another. Further, in the following description of examples or embodiments of the present disclosure, detailed descriptions of well-known functions and components incorporated herein will be omitted when it is determined that the description may make the subject matter in some embodiments of the present disclosure rather unclear. The terms such as "including", "having", "containing", "constituting" "make up of", and "formed of" used herein are generally intended to allow other components to be added unless the terms are used with the term "only". As used herein, singular forms are intended to include plural forms unless the context clearly indicates otherwise.

Terms, such as "first", "second", "A", "B", "(A)", or "(B)" may be used herein to describe elements of the disclosure. Each of these terms is not used to define essence, order, sequence, or number of elements etc., but is used merely to distinguish the corresponding element from other elements.

When it is mentioned that a first element "is connected or coupled to", "contacts or overlaps" etc. a second element, it should be interpreted that, not only can the first element "be directly connected or coupled to" or "directly contact or overlap" the second element, but a third element can also be "interposed" between the first and second elements, or the first and second elements can "be connected or coupled to", "contact or overlap", etc. each other via a fourth element. Here, the second element may be included in at least one of two or more elements that "are connected or coupled to", "contact or overlap", etc. each other.

When time relative terms, such as "after," "subsequent to," "next," "before," and the like, are used to describe processes or operations of elements or configurations, or flows or steps in operating, processing, manufacturing methods, these terms may be used to describe non-consecutive or non-sequential processes or operations unless the term "directly" or "immediately" is used together.

In addition, when any dimensions, relative sizes etc. are mentioned, it should be considered that numerical values for an elements or features, or corresponding information (e.g., level, range, etc.) include a tolerance or error range that may be caused by various factors (e.g., process factors, internal or external impact, noise, etc.) even when a relevant description is not specified. Further, the term "may" fully encompasses all the meanings of the term "can".

Figure 2:
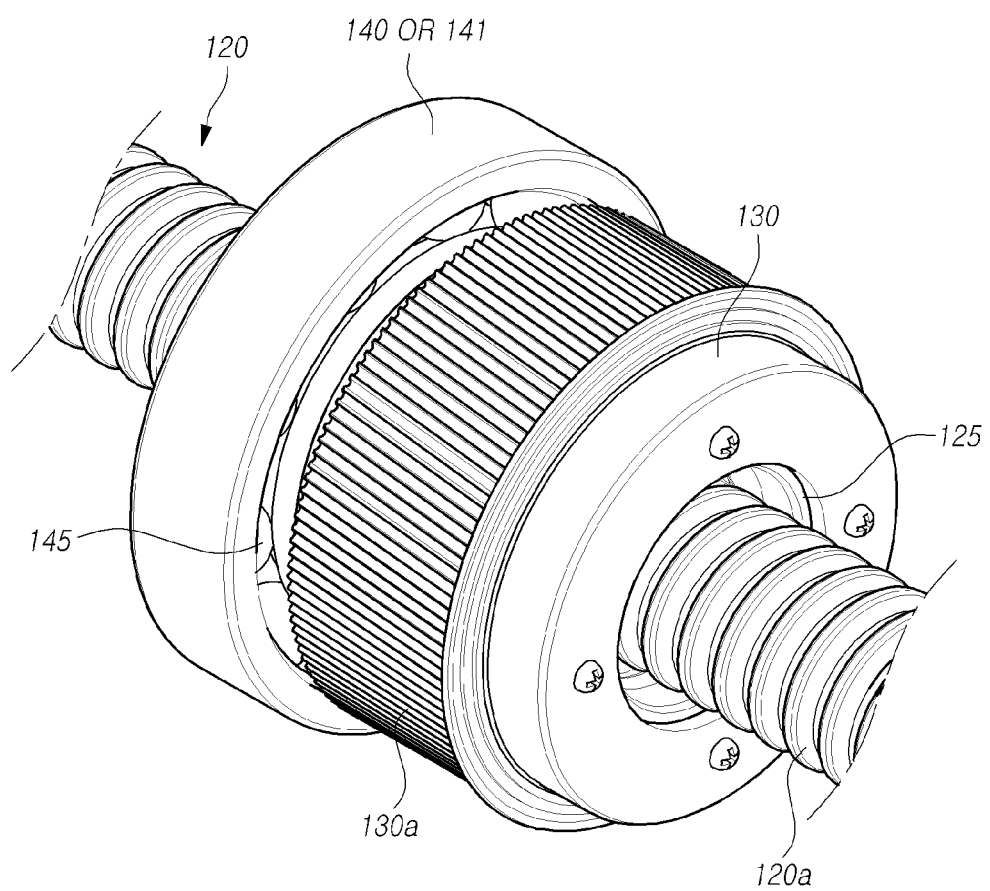
FIG. 2 is a perspective view showing a part of the rack-driven power-assisted steering apparatus according to the present embodiments.
Figure 3:
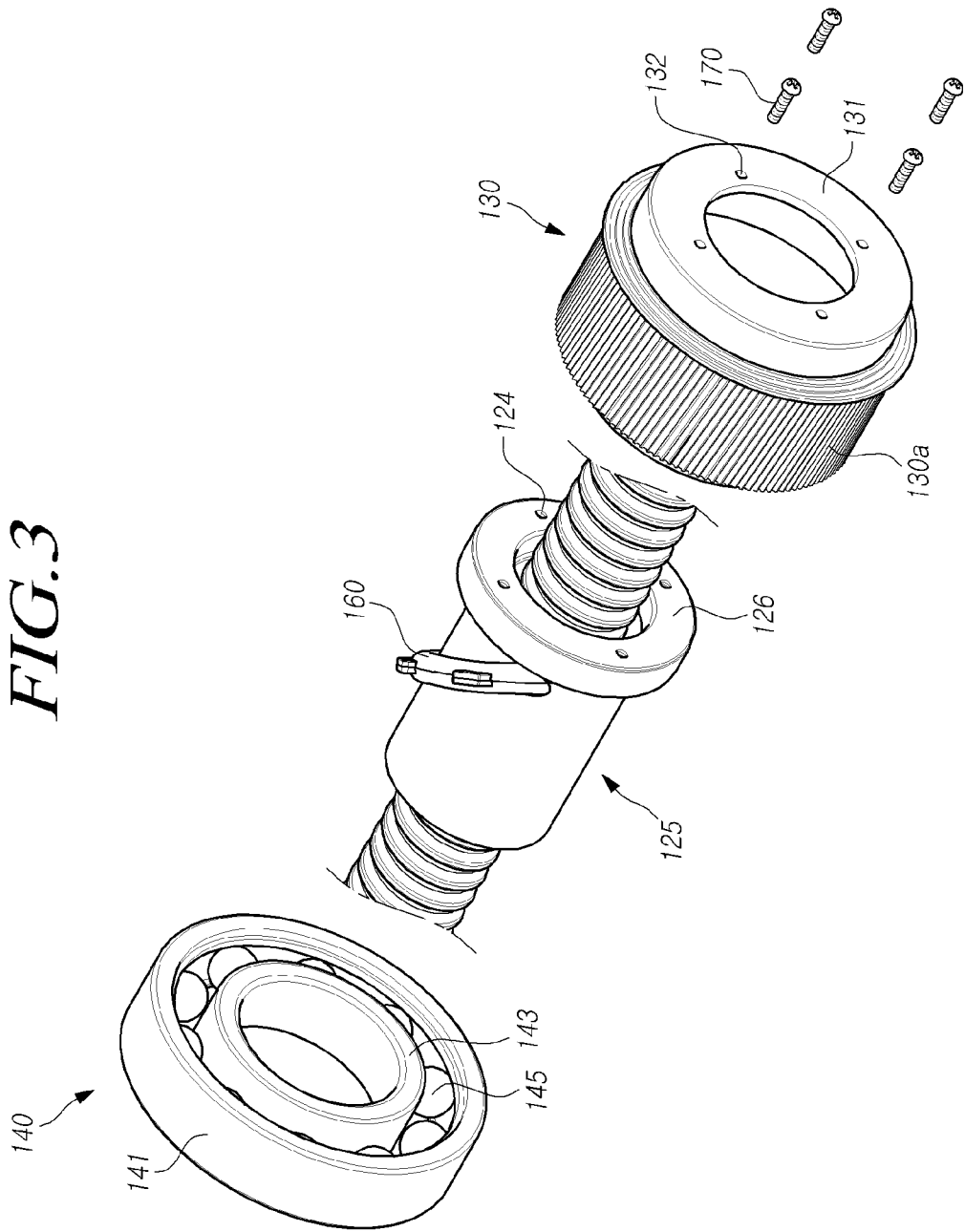
FIGS. 3 and 4 are exploded perspective views of FIG. 2.
Figure 4:
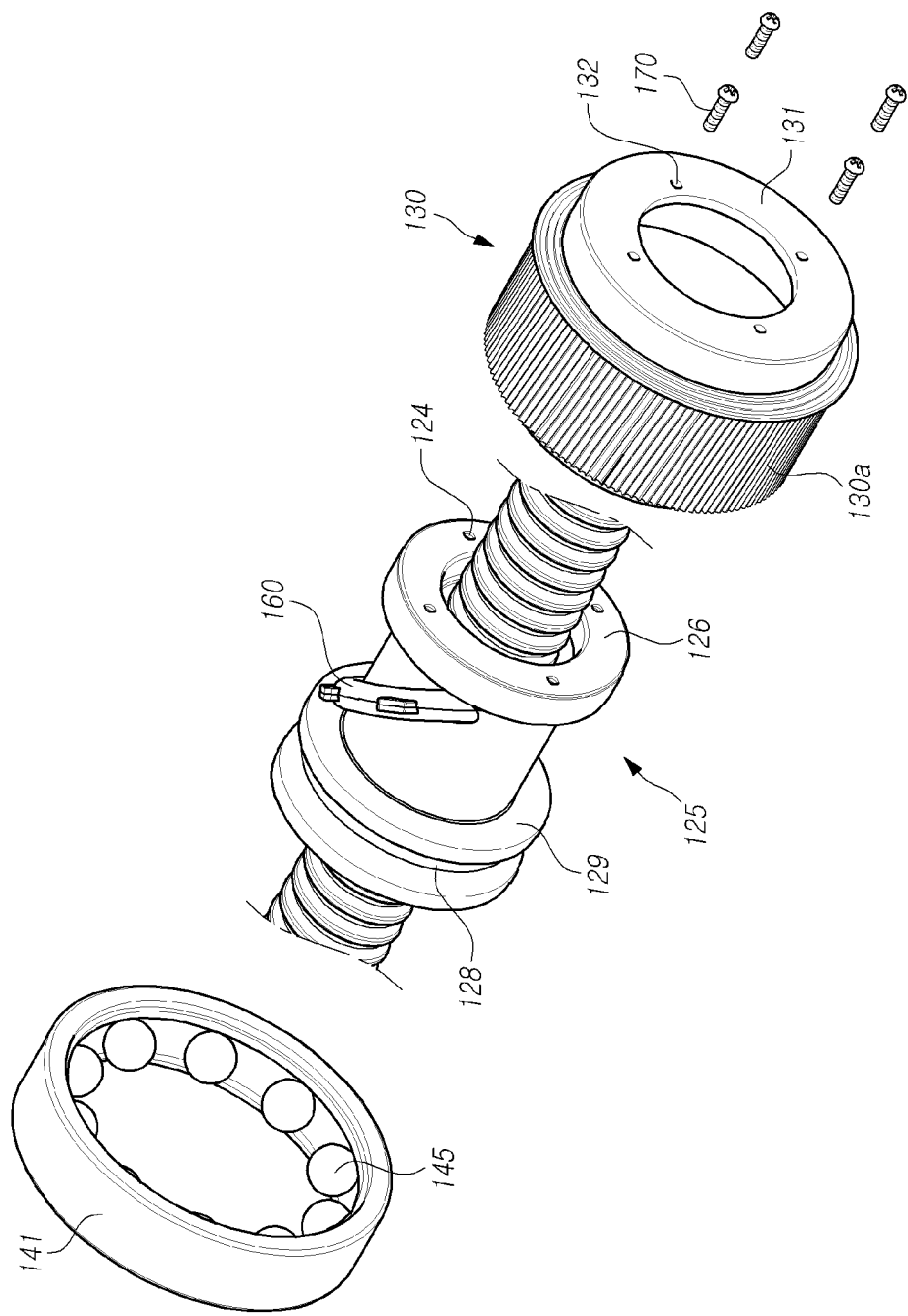
Figure 5:
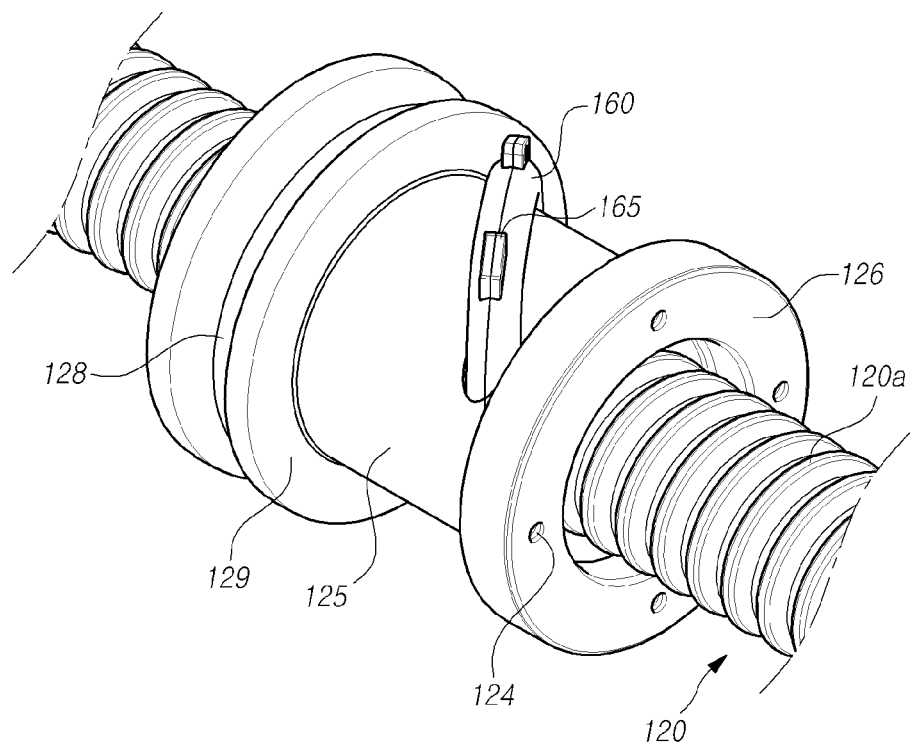
FIGS. 5 to 7 are perspective views showing some of the rack-driven power-assisted steering system according to the present embodiments.
Figure 6:
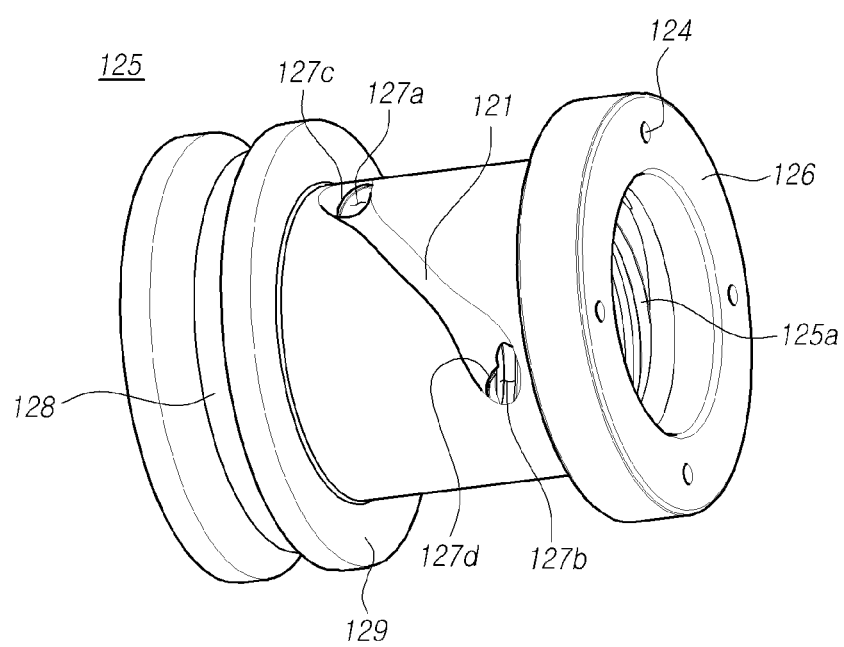
Figure 7:
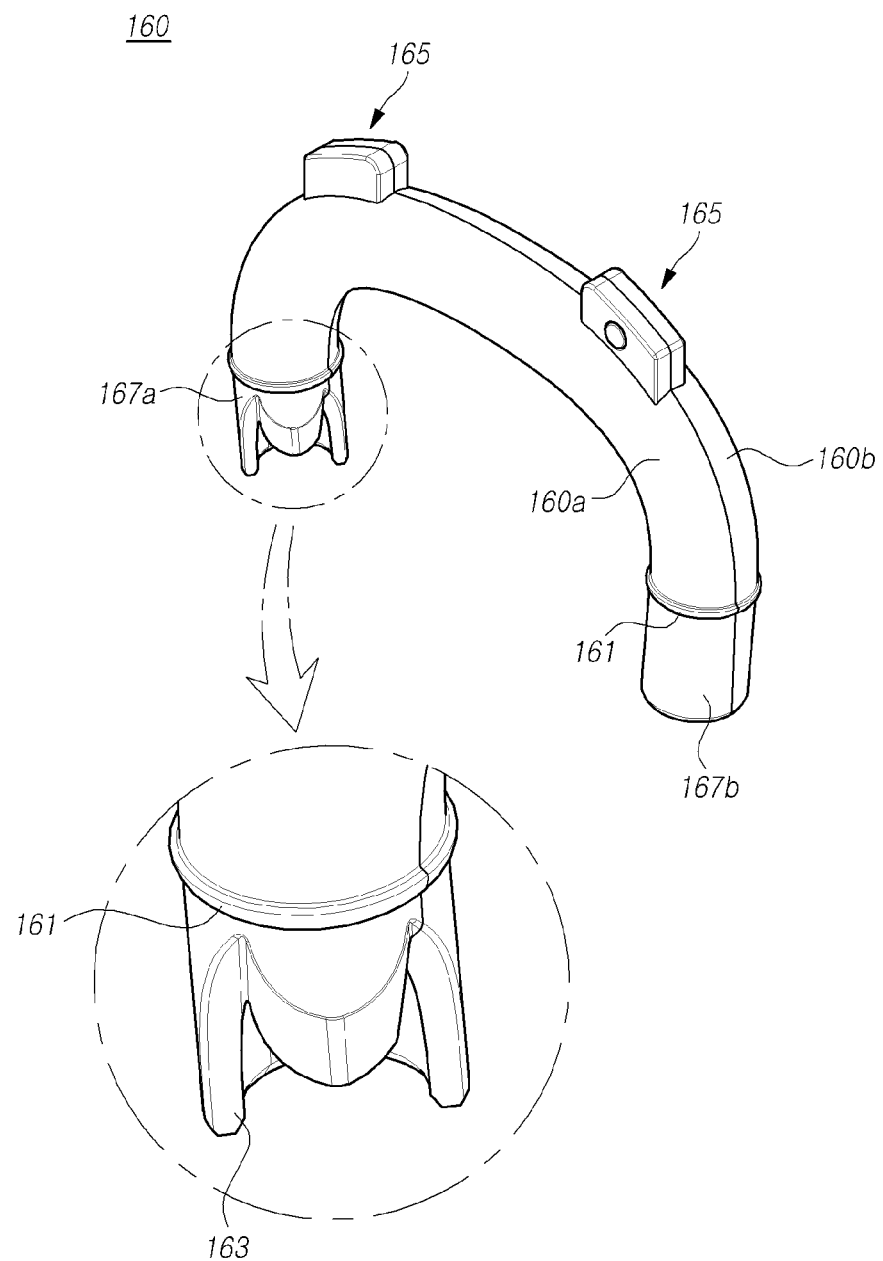
Figure 8:
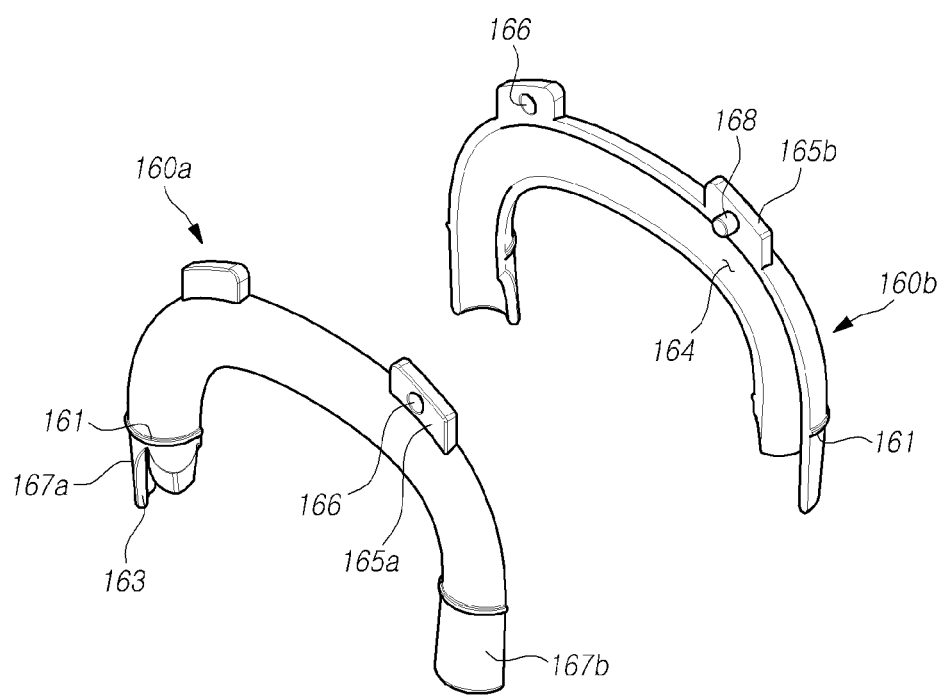
FIG. 8 is an exploded perspective view of FIG. 7.
Figure 9:
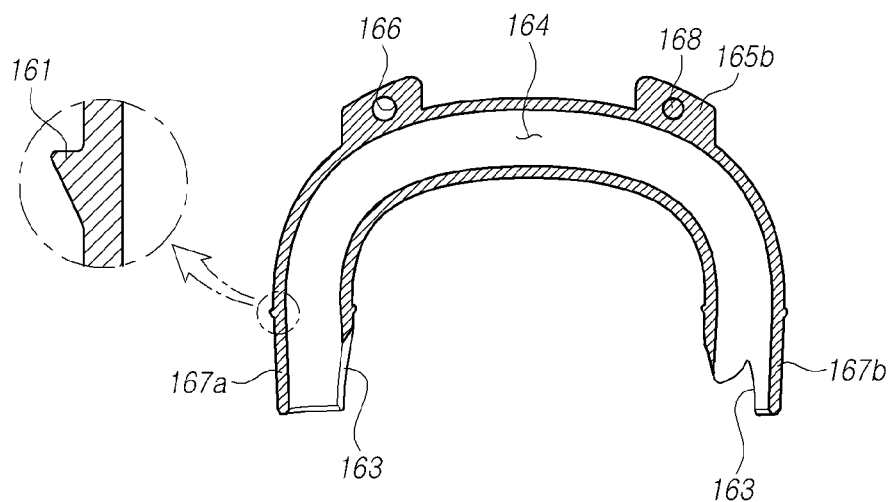
FIG. 9 is a cross-sectional view of FIG. 7.
Figure 10:
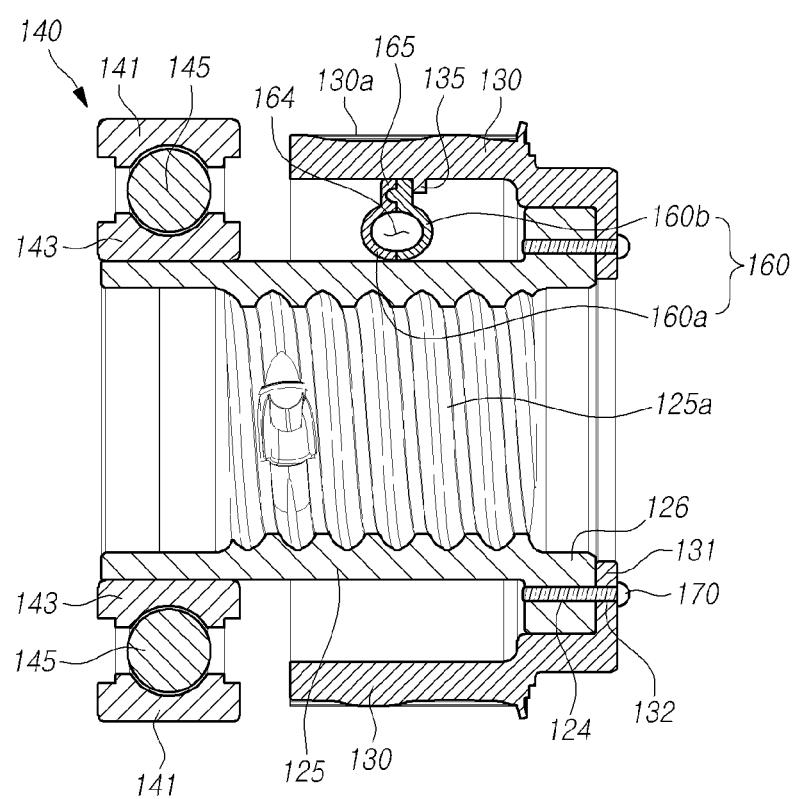
FIGS. 10 to 12 are cross-sectional views showing some of the rack-driven power assisted steering system according to the present embodiments.
Figure 11:
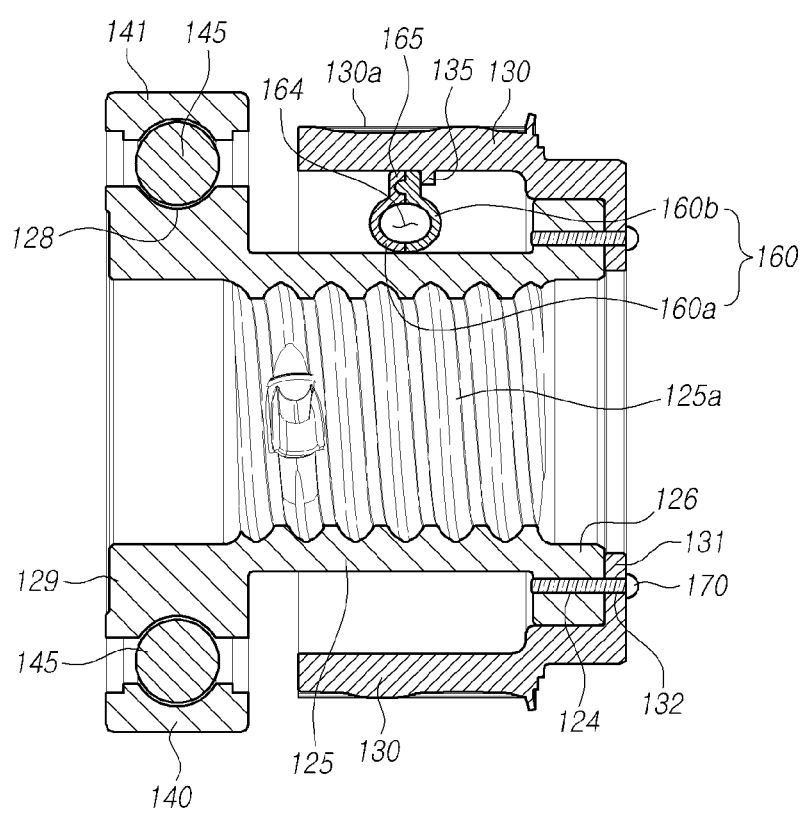
Figure 12:
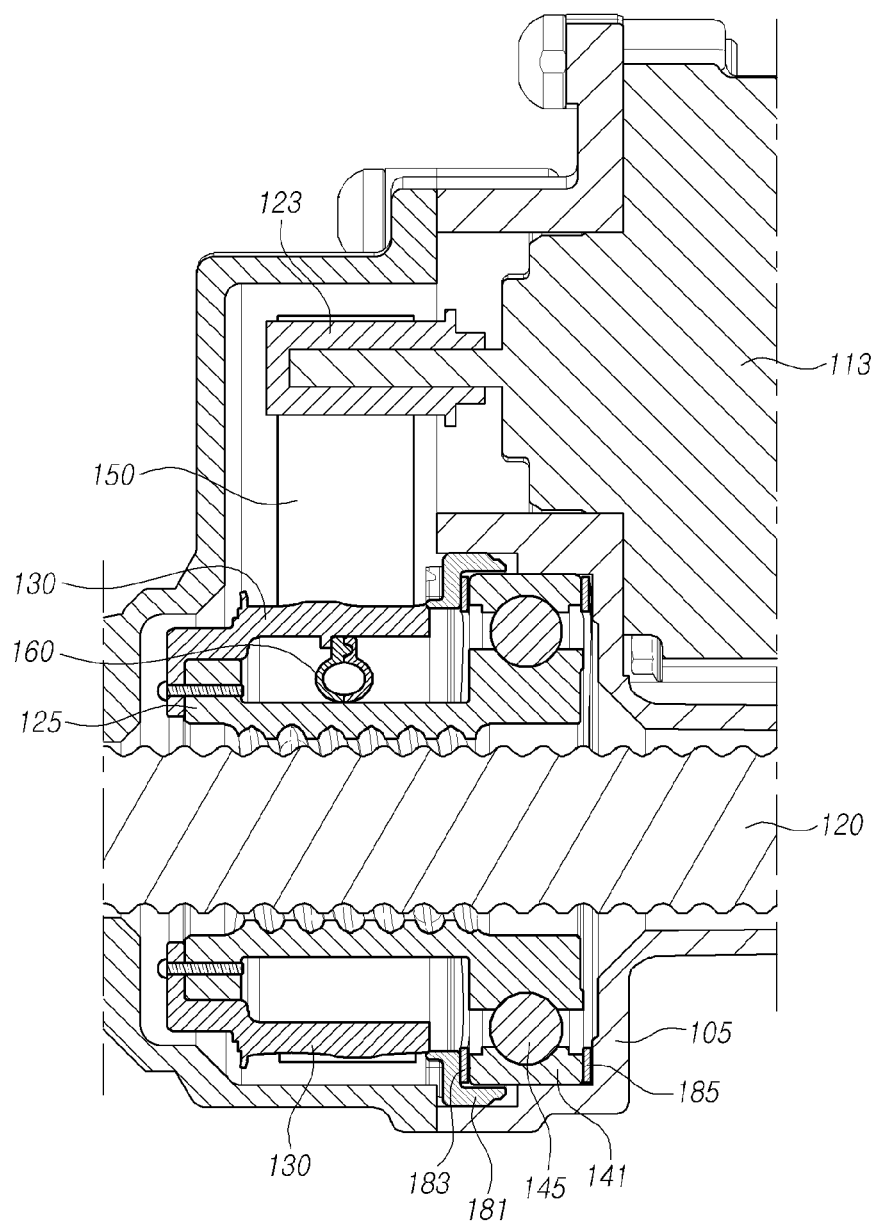

FIG. 1 is a schematic diagram schematically showing a rack-driven power assisted steering apparatus according to the present embodiments. FIG. 2 is a perspective view showing a part of the rack-driven power-assisted steering apparatus according to the present embodiments. FIGS. 3 and 4 are exploded perspective views of FIG. 2. FIGS. 5 to 7 are perspective views showing some of the rack-driven power-assisted steering system according to the present embodiments. FIG. 8 is an exploded perspective view of FIG. 7. FIG. is a cross-sectional view of FIG. 7. FIGS. 10 to 12 are cross-sectional views showing some of the rack-driven power assisted steering system according to the present embodiments.

As illustrated in FIGS. 1 to 12, a rack-driven power-assisted steering apparatus according to the present embodiments include a rack bar 120 having an outer circumferential screw groove 120a formed on its outer circumferential surface, a ball nut 125 having an inner circumferential screw groove 125a corresponding to the outer circumferential screw groove 120 a on an inner circumferential surface, and a pair of first and second ball circulation holes 127 a and 127 b penetrating the inner circumferential and outer circumferential surfaces are spaced apart from each other on both sides along the inner circumferential screw groove 125 a, a nut pulley 130 provided with a space on the inner circumferential surface spaced apart from the outer circumferential surface of the ball nut 125 and coupled to an end of the ball nut 125, and a return tube 160 disposed between the outer circumferential surface of the ball nut 125 and the inner circumferential surface of the nut pulley 130, one end coupled to the first ball circulation hole 127 a and the other end coupled to the second ball circulation hole 127 b to circulate the balls.

In the rack-driven power-assisted steering apparatus according to the present embodiments, the torque sensor 103 is coupled to one side of the steering shafts 102 and 106 connected to the steering wheel 101, and when the driver operates the steering wheel 101, the electric signals received from the torque sensor 103, the steering angle sensor 107 a, the vehicle speed sensor 107 b, etc. that detect it are sent to the motor 113 and steer the both side wheel 115 through the tie rod 119.

In the rack-driven power-assisted steering apparatus according to the present embodiments, the upper steering shaft 102 is connected to the lower steering shaft 106 through the universal joint 104, and steering is performed through the rack-and-pinion mechanism 116 including the pinion 108 and the rack gear 112.

Here, the driving force of the motor 113 driven by the electronic control device 111 is transmitted to the ball nut 125 through the motor 113 and the belt 150, and the rack bar 120 coupled to the ball nut 125 through the ball slides in the axial direction. And a tie rod 119 is coupled to both sides of the rack bar 120, and the tie rod 119 is coupled to a knuckle arm 117 connected to the wheel 115 to steer the wheel 115.

Then, the electrical signal generated from the torque sensor 103 is sent to the electronic control device 111, and the electronic control device 111 controls the motor 113 based on the electric signals transmitted from the torque sensor 103 and the electric signals transmitted from the steering angle sensor 107 a and the vehicle speed sensor 107 b mounted on the vehicle.

A power transmission structure is provided on the inner circumferential surface of the ball nut 125 and the outer circumferential surface of the rack bar 120 to generate a steering assist force by sliding the rack bar 120 in the axial direction. This power transmission structure includes an outer circumferential screw groove 120a having a hemispherical or arc-shaped cross section on the outer circumferential surface of the rack bar 120 and formed in a spiral shape, a ball inserted therein, and an inner circumferential screw groove 125a having a hemispherical or arc-shaped cross section on the inner circumferential surface of the ball nut 125 to correspond to the outer circumferential screw groove 120a and spirally formed.

In the ball nut 125 in which the inner circumferential screw groove 125a is formed on the inner circumferential surface, a pair of first ball circulation hole 127a and second ball circulation hole 127b passing through the inner circumferential surface and the outer circumferential surface are spaced apart from each other on both sides of the ball nut 125 along the inner circumferential screw groove 125a.

Accordingly, the balls rolling along the inner circumferential screw groove 125a can circulate through the first ball circulation hole 127a, the return tube 160, and the second ball circulation hole 127b.

A nut pulley 130 is provided on the outer peripheral side of the ball nut 125, and the inner peripheral surface of the nut pulley 130 is spaced apart from the outer peripheral surface of the ball nut 125 to provide a space, and the nut pulley 130 is coupled to the end of the ball nut 125 by a fastening member 170.

The return tube 160 is disposed between the outer peripheral surface of the ball nut 125 and the inner peripheral surface of the nut pulley 130, and one end 167a of the return tube 160 is coupled to the first ball circulation hole 127a and the other end 167b of the return tube 160 is coupled to the second ball circulation hole 127b so that the balls circulate through the ball nut 125.

As shown in FIGS. 2 and 3, a bearing 140 supported on the outer circumferential surface of the ball nut 125 and the rack housing 105 is coupled at one end of the ball nut 125, and at the other end of the ball nut 125, a pulley coupling portion 126 coupled to the nut pulley 130 may be formed.

That is, the bearing 140 to which the ball 145 is coupled between the outer race 141 and the inner race 143 is coupled to one end of the outer peripheral surface of the ball nut 125, or as shown in FIG. 4, a ball seating portion 129 is formed on the outer peripheral surface of one end of the ball nut 125, and a pulley coupling portion 126 may be formed at the other end of the ball nut 125.

Here, the ball seating portion 129 is formed to protrude radially outward from the outer peripheral surface of one end of the ball nut 125, and a guide groove 128 having an arc-shaped cross section for guiding the rolling movement of the ball is formed on the inner circumferential surface of the ball seating portion 129.

In addition, the ball 145 inserted and supported in the guide groove 128 and the bearing outer race 141 surrounding the ball 145 are coupled to the radial outer peripheral side of the ball seat 129 to support the rotate the ball nut 125. And a first elastic member 185 is coupled between the outer side surface of the bearing outer race 141 in the axial direction and the rack housing 105 to elastically support the ball nut 125 and the nut pulley 130 in the axial direction.

In addition, a second elastic member 183 supported in the axial direction is coupled to the inner side of the bearing outer race 141 in the axial direction, and the inner side of the second elastic member 183 is supported by the lock screw 181 coupled to the rack housing 105, so that the ball nut 125 and the nut pulley 130 are elastically supported on both sides in the axial direction during rotation and axial deviation is prevented.

The first ball circulation hole 127a is disposed adjacent to the ball seating portion 129, and the second ball circulation hole 127b is disposed adjacent to the pulley coupling portion 126, so that the balls rolling along the inner circumference screw groove 125a move from the first ball circulation hole 127a to the second ball circulation hole 127b, and then the balls are circulated to the first ball circulation hole 127a through the ball circulation path 164 of the return tube 160.

The pulley coupling portion 126 is formed to protrude outward in the radial direction while the diameter is enlarged at the end of the ball nut 125, a nut coupling portion 131 coupled to the pulley coupling portion 126 is formed at one end of the nut pulley 130.

The nut coupling portion 131 is formed to protrude radially inwardly while reducing the diameter at the end of the nut pulley 130, so as to support the axially outer side surface of the pulley coupling portion 126 in the axial direction and the nut coupling portion 131 is coupled to the fastening member 170 through the fastening hole 132 of the nut pulley 130 and the fastening hole 124 of the ball nut 125.

The return tube 160 is formed in a "⋂" shape in which both ends that are arranged in approximately parallel are connected to a curved surface. And the return tube 160 is formed in a smooth curved surface from one end 167a to the other end 167b.

In addition, at the end of the return tube 160, a protrusion 161 is formed that protrudes from the outer circumferential surface and is coupled to the first ball circulation hole 127a and the second ball circulation hole 127b.

The protrusion 161 is formed in a ring shape protruding radially from the outer circumferential surface of the return tube 160 and has a tapered shape that decreases in diameter toward the end of the return tube 160.

The ball nut 125 has a support groove 127c and 127d in which the protrusion 161 is inserted and supported on the inner surfaces of the first ball circulation hole 127a and the second ball circulation hole 127b. Accordingly, when the return tube 160 is coupled, the protrusion 161 is elastically deformed and coupled to the support groove 127c and 127d, and the coupling can be maintained without being separated from vibration or external shock due to ball circulation.

In addition, a seating groove 121 connecting the first ball circulation hole 127a and the second ball circulation hole 127b is formed on the outer peripheral surface of the ball nut 125, and the central curved portion of the return tube 160 is seated and coupled to the seating groove 121 so that the return tube 160 can be fixed without shaking when the ball is circulated.

The return tube 160 is coupled to the first ball circulation hole 127a and the second ball circulation hole 127b, and a cutout 163 formed by cutting an outer circumferential surface and an inner circumferential surface is formed on the opposite side of the portion supported by the inner circumferential screw groove 125a. Accordingly, the balls flowing in and out of the return tube 160 can be smoothly rolled into the inner screw groove 125a and the outer screw groove 120a without feeling caught.

In addition, an outer protrusion 165 supported on the inner circumferential surface of the nut pulley 130 is formed on the outer surface of the return tube 160, so that the separation of the return tube 160 caused by shaking due to the collision with the return tube 160 when the balls are circulated is prevented.

The return tube 160 includes a first return tube 160a and a second return tube 160b formed to be symmetrically separated on both sides along the central axis, the outer protrusion 165 is formed at corresponding positions 165a and 165b of the first return tube 160 and the second return tube 160.

In addition, the outer protrusion 165 has a coupling protrusion 168 and a coupling hole 166 formed on each abutting surface, so that the first return tube 160a and the second return tube 160b can be maintained in a coupled state to each other.

The outer protrusion 165 may include at least one or more. In the present embodiments, it is shown as an example that two outer protrusions are formed on the central curved portion of the return tube 160.

And, an inner protrusion 135 for supporting the side surface of the outer protrusion 165 is formed on the inner circumferential surface of the nut pulley 130 to prevent the return tube 160 from being separated in the circumferential direction.

The inner protrusion 135 may be formed as a pair to support both sides of the outer protrusion 165 or only one may be formed to support only one side of the outer protrusion 165, in a case of the inner protrusion 135 is formed in a pair, it is arranged in a spiral position and is assembled by rotating the nut pulley 130 when the nut pulley 130 and the ball nut 125 are coupled. In the present exemplary embodiment, the inner protrusion 135 supports one side of the outer protrusion 165 as an example.

The motor pulley 123 connected to the shaft of the motor 113 and the nut pulley 130 connected to the ball nut 125 are arranged parallel to each other. A belt 150 is fitted between the motor pulley 123 and the nut pulley 130 to transmit the rotational force of the motor 113 to the rack bar 120 through the ball nut 125, and the rack bar 120 is moved left and right to generate a steering assist force by the operation of the ball nut 125.

The ball nut 125 is coupled to the rack bar 120 through a ball and rotates to slide the rack bar 120 from the inside of the rack housing 105.

The nut pulley 130 is formed in a hollow shape, and a serration portion 130a for preventing slip of the belt 350 is formed on the outer peripheral surface of the central portion.

This nut pulley 130 rotates the ball nut 125 with the driving force of the belt 150 by the rotation of the motor pulley 123, thereby linearly moving the rack bar 120 left and right.

According to the present embodiments, there may be provided a rack-driven power assisted steering apparatus in which even if the vehicle is continuously steered while driving, the return tube is not separated from the ball nut, deformed or damaged and the ball is precisely circulated through the return tube to the ball nut to deliver the correct steering assistance force.

The above description has been presented to enable any person skilled in the art to make and use the technical idea of the present disclosure, and has been provided in the context of a particular application and its requirements. Various modifications, additions and substitutions to the described embodiments will be readily apparent to those skilled in the art, and the general principles defined herein may be applied to other embodiments and applications without departing from the spirit and scope of the present disclosure. The above description and the accompanying drawings provide an example of the technical idea of the present disclosure for illustrative purposes only. That is, the disclosed embodiments are intended to illustrate the scope of the technical idea of the present disclosure. Thus, the scope of the present disclosure is not limited to the embodiments shown, but is to be accorded the widest scope consistent with the claims. The scope of protection of the present disclosure should be construed based on the following claims, and all technical ideas within the scope of equivalents thereof should be construed as being included within the scope of the present disclosure.

The invention claimed is:

1. A rack-driven power assisted steering apparatus, comprising:
    a rack bar having an outer circumferential screw groove formed on an outer circumferential surface of the rack bar;
    a ball nut having an inner circumferential surface of the ball nut, an outer circumferential surface of the ball nut, an inner circumferential screw groove corresponding to the outer circumferential screw groove formed on the inner circumferential surface of the ball nut, and a pair of ball circulation holes, each of the pair being referred to as a first ball circulation hole and a second ball circulation hole, respectively, penetrating the inner circumferential surface of the ball nut and the outer circumferential surface of the ball nut and being spaced apart from each other along the inner circumferential screw groove;
    a nut pulley having an inner circumferential surface of the nut pulley spaced apart from the outer circumferential surface of the ball nut and coupled to a first end of the ball nut; and
    a return tube disposed between the outer circumferential surface of the ball nut and the inner circumferential surface of the nut pulley, a first end of the return tube coupled to the first ball circulation hole and a second end of the return tube coupled to the second ball circulation hole to circulate circulation balls,
    wherein an outer protrusion supported on an inner circumferential surface of the nut pulley is formed on an outer surface of the return tube.

2. The rack-driven power assisted steering apparatus of claim 1, wherein a bearing supported by the outer circumferential surface of the ball nut and a rack housing is coupled to a second end of the ball nut, and a pulley coupling portion to which the nut pulley is coupled is formed at the first end of the ball nut.

3. The rack-driven power assisted steering apparatus of claim 1, wherein a ball seating portion protruding radially outward from the outer circumferential surface of the ball nut and provided with a guide groove for guiding the ball is formed at a second end of the ball nut, and a pulley coupling portion to which the nut pulley is coupled is formed at the first end of the ball nut.

4. The rack-driven power assisted steering apparatus of claim 3, wherein a ball bearing, having balls located in a bearing outer race, are coupled to a radial outer periphery of the ball seating portion, and a first elastic member is coupled between an axial outer side of the bearing outer race and a rack housing, so that the ball nut and the nut pulley are supported in an axial direction.

5. The rack-driven power assisted steering apparatus of claim 4, wherein a second elastic member supported in the axial direction is coupled to an axially inner side surface of the bearing outer race, and an inner side of the second elastic member is supported by a lock screw coupled to the rack housing.

6. The rack-driven power assisted steering apparatus of claim 3, wherein the first ball circulation hole is disposed adjacent to the ball seating portion and the second ball circulation hole is disposed adjacent to the pulley coupling portion.

7. The rack-driven power assisted steering apparatus of claim 3, wherein the pulley coupling portion is formed to protrude outward in a radial direction while a diameter of the pulley coupling portion is enlarged at the first end of the ball nut.

8. The rack-driven power assisted steering apparatus of claim 7, wherein a nut coupling portion coupled to the pulley coupling portion is formed at an end of the nut pulley.

9. The rack-driven power assisted steering apparatus of claim 8, wherein the nut coupling portion supports an outer side surface of the pulley coupling portion in an axial direction and is coupled to the pulley coupling portion by a fastening member.

10. The rack-driven power assisted steering apparatus of claim 8, wherein the nut coupling portion is formed to protrude inward in the radial direction while reducing a diameter of the nut coupling portion at the end of the nut pulley.

11. The rack-driven power assisted steering apparatus of claim 1, wherein a first protrusion is formed at the first end of the return tube, which protrudes from an outer circumferential surface at the first end of the return tube and is coupled to the first ball circulation hole and a second protrusion is formed at the second end of the return tube, which protrudes from an outer circumferential surface at the second end of the return tube and is coupled to the second ball circulation bole.

12. The rack-driven power assisted steering apparatus of claim 11, wherein each of the first and second protrusions is formed in a tapered shape that protrudes in a radial direction from the outer circumferential surface at the first end of the return tube and from the outer circumferential surface at the second end of the return tube, respectively, and decreases in diameter toward the first end and second end of the return tube, respectively.

13. The rack-driven power assisted steering apparatus of claim 12, wherein the ball nut is formed with support grooves in which the first and second protrusions are inserted and supported on inner surfaces of the first ball circulation hole and the second ball circulation hole.

14. The rack-driven power assisted steering apparatus of claim 1, wherein a seating groove connecting the first ball circulation hole and the second ball circulation hole is formed on the outer circumferential surface of the ball nut, and the return tube is seated in the seating groove.

15. The rack-driven power assisted steering apparatus of claim 1, wherein the return tube is coupled to the first ball circulation hole and the second ball circulation hole, and a cutout is formed on an opposite side of a portion supported by the inner circumferential screw groove by cutting an outer circumferential surface and an inner circumferential surface at the first and second end of the return tube.

16. The rack-driven power assisted steering apparatus of claim 1, wherein the return tube includes a first return tube half and a second return tube half formed to be symmetrically separated on both sides along a central axis.

17. The rack-driven power assisted steering apparatus of claim 16, wherein a first outer protrusion half is formed on the first return tube half and a second outer protrusion half is formed on the second return tube half, the first and second outer protrusion halves configured to form the outer protrusion when coupled.

18. The rack-driven power assisted steering apparatus of claim 17, wherein the first outer protrusion half has a coupling protrusion formed on a surface of the first outer protrusion half and the second outer protrusion half has a coupling hole formed on a surface of the second outer protrusion half, and the coupling protrusion is configured to be inserted into the coupling hole when the surface of the first outer protrusion half and the surface of the second outer protrusion half are in contact with each other.

19. The rack-driven power assisted steering apparatus of claim 1, wherein an inner protrusion for supporting the outer protrusion is formed on the inner circumferential surface of the nut pulley.

20. The rack-driven power assisted steering apparatus of claim 19, where the inner protrusion is formed as a pair to support both sides of the outer protrusion.

* * * * *